United States Patent [19]
Miura et al.

[11] Patent Number: 5,050,157
[45] Date of Patent: Sep. 17, 1991

[54] FRICTION REDUCING PIEZOELECTRIC FEED GUIDE MECHANISM

[75] Inventors: Masafumi Miura; Susumu Ito, both of Osaka, Japan

[73] Assignee: NEC Home Electronics Ltd., Osaka, Japan

[21] Appl. No.: 272,825

[22] Filed: Nov. 18, 1988

[30] Foreign Application Priority Data

Nov. 30, 1987 [JP] Japan ................ 62-302540

[51] Int. Cl.⁵ .............. G11B 19/00; G11B 17/30; G11B 5/24; G11B 5/48
[52] U.S. Cl. .................. 369/215; 369/219; 369/244; 360/104; 360/105
[58] Field of Search ............ 369/244, 44, 45, 46, 369/215; 360/104, 105

[56] References Cited

U.S. PATENT DOCUMENTS

| | | | |
|---|---|---|---|
| 4,188,645 | 2/1980 | Ragle et al. | 360/104 X |
| 4,302,830 | 11/1981 | Hamaoka et al. | 369/45 |
| 4,479,051 | 10/1984 | Musha | 369/44 X |
| 4,538,191 | 8/1985 | Suzuki et al. | 360/88 |
| 4,605,977 | 8/1986 | Matthews | 360/103 |
| 4,745,589 | 5/1988 | Nomura | 369/44 X |
| 4,955,598 | 9/1990 | Hiroshige et al. | 271/267 |

FOREIGN PATENT DOCUMENTS

| | | | |
|---|---|---|---|
| 59-96881 | 6/1984 | Japan | . |
| 59-109038 | 6/1984 | Japan | . |
| 59-188381 | 10/1984 | Japan | . |
| 60-91879 | 5/1985 | Japan | . |
| 0222996 | 5/1985 | Japan | 369/215 |

Primary Examiner—Stuart S. Levy
Assistant Examiner—Kenneth B. Wells
Attorney, Agent, or Firm—Cushman, Darby & Cushman

[57] ABSTRACT

A feed guide mechanism for guiding a reciprocating movable member with a guide member having tabular elastic members forming a guide surface for guiding the reciprocal movement of the movable member on one surface thereof. A piezoelectric member with alternately polarized portions are attached to an opposite surface of the guide member. The piezoelectric member undergoes a polarization so that application of an alternating current produces a standing wave to urge the movable member upward and reduce friction.

14 Claims, 3 Drawing Sheets

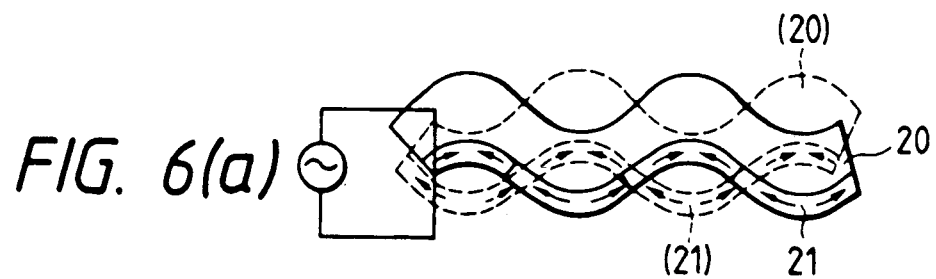
FIG. 6(a)
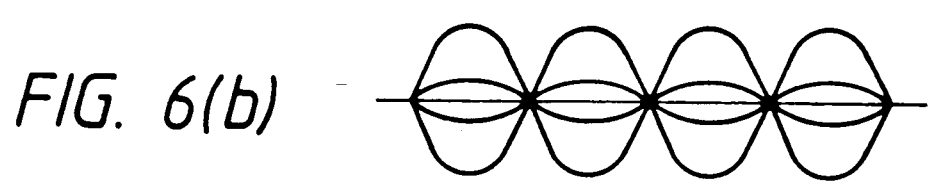
FIG. 6(b)
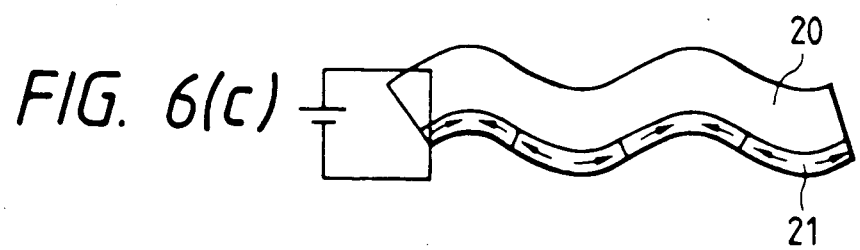
FIG. 6(c)
FIG. 7
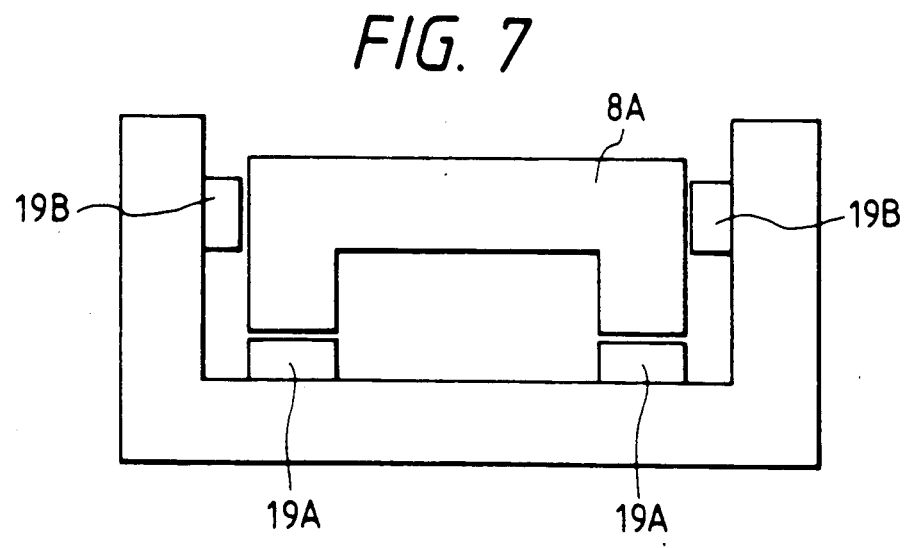

FRICTION REDUCING PIEZOELECTRIC FEED GUIDE MECHANISM

BACKGROUND OF THE INVENTION

The present invention relates to a feed guide mechanism for guiding a reciprocating movable member.

A conventional feed guide mechanism employed as a means for support-guiding a movable member in a rectilinear reciprocation mechanism is generally a system wherein a fixed member and the movable member slide while their slide surfaces are simply brought into contact with each other. For instance, the feed guide mechanisms for an optical head in an optical disc drive and for a printing head of a printer each have such a structure wherein the movable member is supported through a bushing on a slide shaft so as to be reciprocally movable.

In this prior art feed guide mechanism the frictional resistance between the movable member and the fixed member is large, so that minute motions are hindered. It is therefore difficult to provide a smooth feeding motion.

SUMMARY OF THE INVENTION

It is a primary object of the present invention to provide a feed guide mechanism in which the movable member moves smoothly.

These and other objects of the present invention are achieved by a feed guide mechanism comprising: a guide member having a plurality of tabular elastic members and forming a guide surface for guiding a movable member; and a plurality of tabular piezoelectric members on a surface of the guide members opposite of the guide surface. The piezoelectric member are polarized wherein the polarizing directions thereof are alternately inverted.

Based on this construction, when an AC voltage is impressed on the piezoelectric member, the elastic member is deformed in undulation due to the distortion product by alternate expansion and contraction of the piezoelectric member. Peaks and troughs of the undulate flexure are alternately inverted so that stationary waves—i.e., the waves which make up-and-down motions in the same position are generated in the elastic member.

The movable member on the guide surface of the elastic member is always thrust upwards by the force of the stationary waves of the elastic member, thus supporting the movable member afloat. Consequently, the frictional resistance is remarkably decreased, and therefore the feeding motion of the movable member is sufficiently smooth.

Many other features, advantages and additional objects of the present invention will become manifest to one skilled in the art upon making reference to the detailed description which follows and the accompanying drawings.

BRIEF DESCRIPTION OF THE DRAWINGS

FIGS. 6(a), 6(b) and 6(c) are explanatory views illustrating a mechanism in which stationary waves are produced; and FIG. 7 is a sectional view showing another embodiment of the present invention.

DETAILED DESCRIPTION OF THE PREFERRED EMBODIMENT

Figure 1:
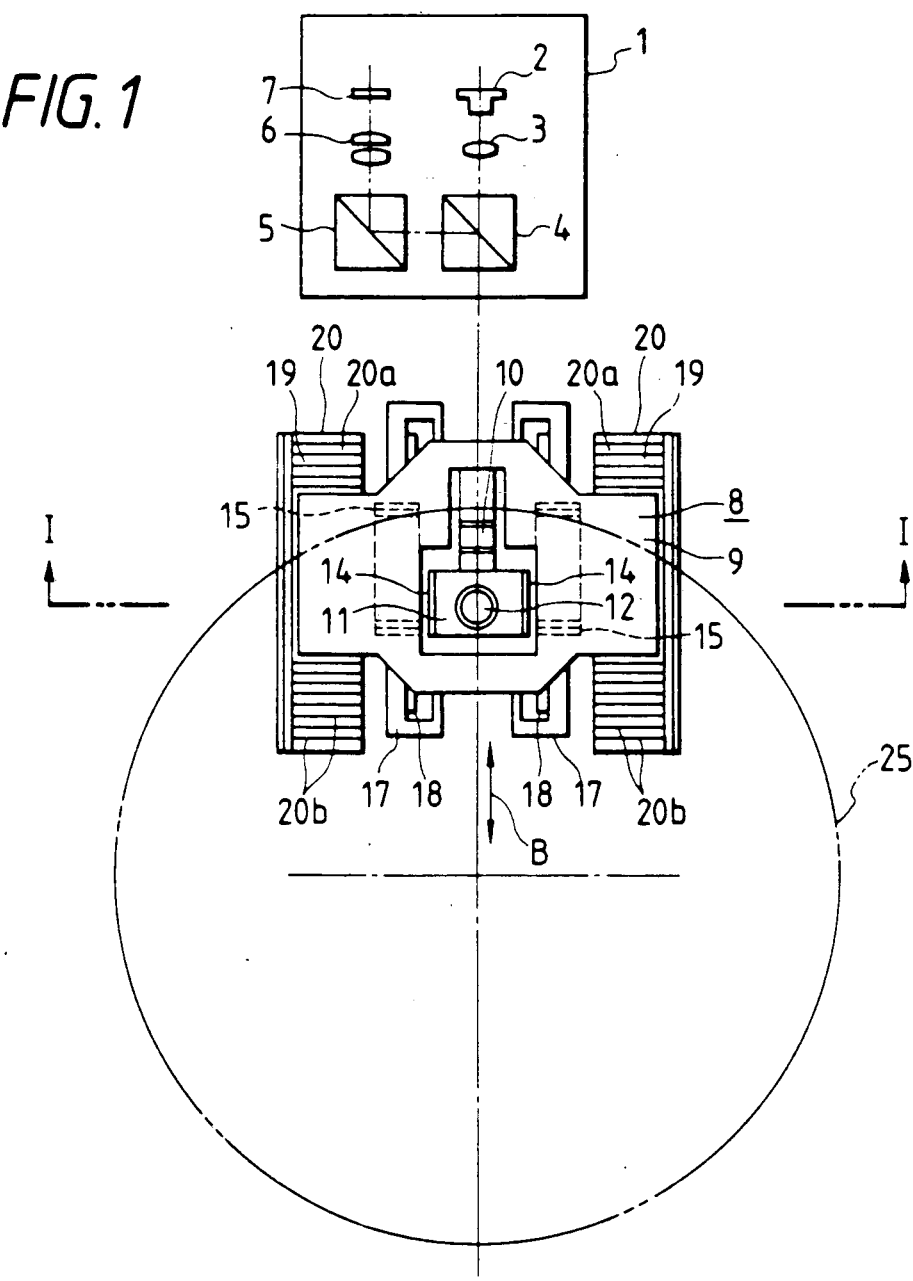
FIG. 1 is a plan view of an optical system in an optical disc drive.
Figure 2:
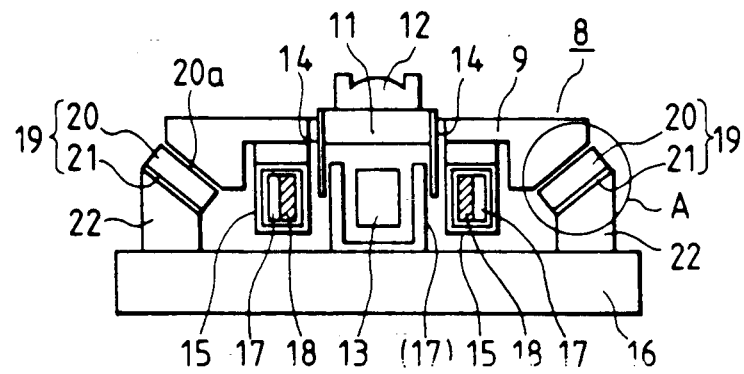
FIG. 2 is a front sectional view, taken substantially along the line 1—1 of FIG. 1, of the optical head.

The embodiments of the present invention will hereinafter be described with reference in FIGS. 1 to 7 wherein like references correspond to parts throughout. An optical system 1 is seen in FIGS. 1 and 2. As seen in FIG. 2, the optical system 1 is fixed to a chassis 16. This fixed optical system consists essentially of a laser diode 2, a collimator lens 3, half-mirrors 4 and 5, a cylindrical lens 6 and a photodetector 7.

Figure 3:
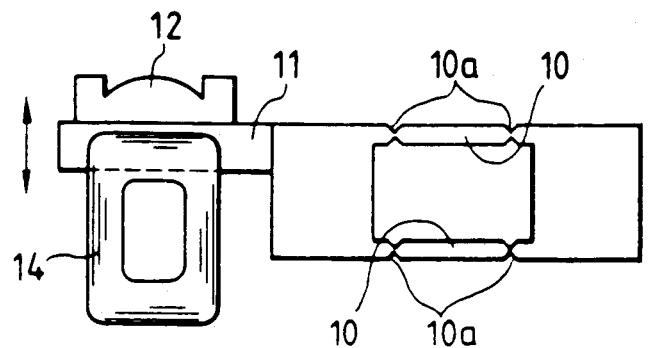
FIG. 3 is a slide view of the object lens holder of the optical head.

A movable optical head 8 is arranged in the following manner. An object lens holder 11 is, as illustrated in FIG. 3, mounted through two pieces of hinge type parallel springs 10 (a hinge portion is indicated by 10a) on a head base 9. An object lens 12 is fitted to the object lens holder 11. A 90° mirror 13 is installed beneath the object lens 12. Focusing coils 14 are, as shown in FIG. 1, provided on both sides of the object lens holder 11. Cylindrical feed driving coils 15 each serving as a coil for tracking drive are provided at the right and left portions of the underside of the optical head base 9. A yoke 17 and a permanent magnet 18 are fixedly provided on chassis 16 in the head feeding directions (the directions indicated by arrows B in FIG. 1). The yoke 17 and the permanent magnet 18 are disposed to pass through the feed driving coil 15.

Figure 4:
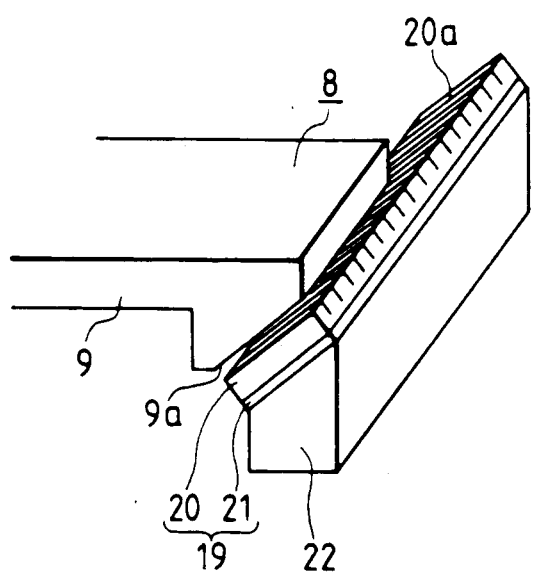
FIG. 4 is an enlarged respective view of a portion A depicted in FIG. 2.
Figure 5:
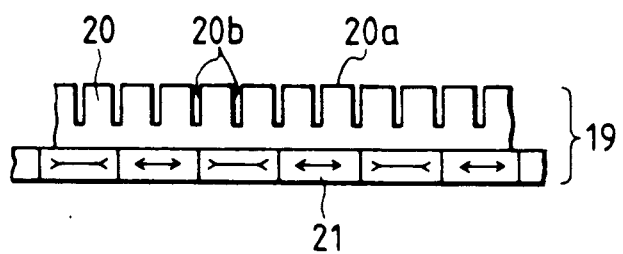
FIG. 5 is an explanatory view illustrating a structure of the portion A.

A guide rail 19 for supporting the optical head 8 and guiding the reciprocations thereof serves as a feed guide mechanism in the embodiment of the present invention. The guide rail 19 is, as depicted in FIG. 4 comprised of elastic members 20 which are tabular in form and formed from metals such as phosphor bronze and include guide surfaces parallel to inclined surfaces 9a formed on both sides of the optical head base 9. Tabular piezoelectric ceramic members 21 are bonded to the back of the elastic members 20 with bonding agents. The piezoelectric members 21 are, as depicted in FIG. 5, polarized so that the polarizing directions of the ceramics 21 are alternately inverted in direction (the arrows indicate the directions of expansion and contraction). The elastic members 20 are formed with a multiplicity of slits 20b for increasing an amount of deformation of the stationary waves. The guide rails 19 are fixedly bonded to the inclined surfaces of support boards 22 fixed to the chassis 16.

In operation, when an electric current flows through the feed driving coil 15, the optical head 8 is driven in the radial directions (the directions indicated by the arrows B of a disc 25 by an electomagnetic force generated by the current and the permanent magnets 18. At this time, the optical head 8 reciprocates in the directions of the arrows B while being support-guided by the bilaterally laid guide rails 19. During this feed guide operation, AC voltages are, as shown in FIG. 6(a), applied to the piezoelectric ceramics 21 of the guide rails 19.

If DC voltages are, as depicted in FIG. 6(c), applied to the piezoelectric ceramics 21, deformation, produced by expansion and contraction extend longitudinally alternately in accordance with the polarizing directions of the piezoelectric ceramics 21. As a result, the elastic members 20 are deformed in undulation and vibration does not occur. However, AC voltages are applied on the piezoelectric ceramics 12, and hence the peaks and troughs of the flexural deformation in the form of undulation are, as indicated by solid and broken lines in FIG. 6(a), alternately inverted at a certain fixed positions. Namely, stationary waves, i.e., the waves which repeatedly make the up-and-down motions in the same position, are produced in the elastic members 20. FIG. 6(b) illustrates a mode of the stationary waves.

Therefore, the optical head 8 on the guide surface 20a of the elastic member 20 is constantly thrust upwards by the stationary waves of the elastic members 20 while being supported afloat, thereby substantially decreasing the frictional resistance, smoothing feeding of feeding optical head 8.

In the above-described embodiment, the movable member is support-guided by the two pieces of right and left guide rails 19 each having an inclined guide surface. As depicted in FIG. 7, however, it is possible to separately provide guide rails 19A for support-guiding a movable member 8A in the vertical direction and guide rails 19B designed for laterally guiding the movable member 8A. The bilaterally laid guide rails 19B shown in FIG. 7 may merely be guide members which are not based on the present invention, depending on the usage thereof.

In the foregoing embodiment, the present invention is applied to the feed guide mechanism for the optical head. The present invention is not, however, confined to this type of mechanism but may be applied to a feed guide mechanism for a printing head of a printer, movable members of an optical system in a copying machine and movable members of a machine tool. In addition, the application may extend to many other feed guide mechanisms and the movable member may make a curved motion instead of the rectilinear motion.

As discussed above, the feed guide mechanism according to the present invention includes the tabular elastic members forming the guide surface for guiding the movable member; and the tabular piezoelectric members, stuck to the opposite surface to the guide surface of the elastic member, on which the polarization process was effected so that the polarizing directions thereof are alternately inverted. In this construction, it is feasible to support-guide the movable member in a state where the stationary waves are generated in the elastic member by impressing the AC voltage on the piezoelectric member. The frictional resistance can remarkably be reduced, thereby attaining the providing the smooth operation of feeding the movable member in the feed guide mechanism.

Although the illustrative embodiment of the present invention has been described in greater detail with reference to the accompanying drawings, it is to be understood that the invention is not limited to the precise embodiment. Various changes or modifications may be effected therein by one skilled in the art without departing from the scope or the spirit of the invention.

What is claimed is:

1. A feed guide mechanism for a movable member which moves along a desired path comprising:
    a guide member for supporting and guiding the movable member along the desired path; and
    means to move said guide member so as to form stationary waves therewith, said guide member moving so that said movable member oscillates and rises upward with respect to the guide member.

2. A feed guide mechanism as in claim 1 wherein said guide member comprises a plurality of tabular elastic members and has a guide surface along which said movable member moves along said desired path.

3. A feed guide mechanism as in claim 2 wherein the means to move said guide member comprises:
    tabular piezoelectric members disposed on a surface of said guide member opposite to said guide surface; and
    means for applying an alternating current to said piezoelectric members thereby causing said elastic members to alternately expand and contract.

4. A feed guide mechanism as in claim 3 wherein the movable member is an optical head.

5. A feed guide mechanism for a movable member which moves along a desired path comprising:
    a plurality of tabular elastic members forming a guide surface along the desired path, said movable member being supported by said plurality of tabular elastic members and being guided along said guide surface; and
    means to move said plurality of tabular elastic members to oscillate said movable member so that said movable member rises upward with respect to said plurality of tabular elastic members.

6. A feed guide mechanism as in claim 5 wherein said means to move said guide member comprises:
    tabular piezoelectric members disposed on a surface of said guide member opposite to said guide surface; and
    means for applying an alternating current to said piezoelectric members thereby causing said elastic members to alternately expand and contract thereby forming a standing wave.

7. A feed guide mechanism as in claim 6 wherein said movable member is an optical head.

8. A method for feed guiding a movable member disposed on a guide member, the guide member being comprised of a plurality of tabular piezoelectric members, said method comprising the steps of:
    moving said guide member so as to form a standing wave so that said movable member oscillates and rises upward with respect to the guide member while simultaneously moving said movable member along said guide surface along said desired path.

9. A method as in claim 8 wherein said guide member moving step comprises applying an alternating current to said piezoelectric tabular members so that they alternately expand and contract.

10. On an optical head, an optical system comprising:
    means for emitting a beam of light toward said optical head;
    means for moving said optical head along a radial disc path;
    a guide member for supporting said optical head;
    means for moving the guide member to oscillate said optical head so that said optical head rises upward with respect to the guide member.

11. An optical system as in claim 10 wherein said optical head comprises:
    a object lens;
    a housing to hold said object lens; and first and second focusing lenses disposed on said housing.

12. An optical system as in claim 11 wherein said guide member comprises a plurality of tabular elastic members and has a guide surface along which said optical head moves along said radial disc path.

13. An optical system as in claim 12 wherein said means to move said guide member comprises:

tabular piezoelectric members disposed on a surface of said guide member opposite to said guide surface; and means for applying an alternating current to said piezoelectric members thereby causing said elastic members to alternately expand and contract.

14. An optical system as in claim 13 wherein said means for emitting a beam of light is a laser diode.

* * * * *